United States Patent
Lee

(10) Patent No.: US 6,276,878 B1
(45) Date of Patent: Aug. 21, 2001

(54) HORIZONTAL CUTTING-TYPE TAPPING MACHINE

(76) Inventor: Woo Kag Lee, 1 Dong 411 Ho, Dongseoul Hanyang Apartment 41, Dapsipri Dong, Dongdaemoon-Ku, Seoul (KR)

( * ) Notice: Subject to any disclaimer, the term of this patent is extended or adjusted under 35 U.S.C. 154(b) by 0 days.

(21) Appl. No.: 09/439,372

(22) Filed: Nov. 15, 1999

(51) Int. Cl.$^7$ ...................................................... B23B 41/08
(52) U.S. Cl. ........................... 408/67; 137/318; 408/127; 408/137; 409/201; 409/215
(58) Field of Search ............... 408/67, 124, 127, 408/137; 137/15.13, 15.14, 318; 409/201, 215, 216

(56) References Cited

U.S. PATENT DOCUMENTS

| | | | |
|---|---|---|---|
| 525,385 | * | 9/1894 | Feely .................................... 408/137 |
| 6,068,019 | * | 5/2000 | Lee ....................................... 137/318 |

* cited by examiner

Primary Examiner—Steven C. Bishop

(74) Attorney, Agent, or Firm—Robert W. Becker & Associates; Robert W. Becker

(57) ABSTRACT

A horizontal cutting type-tapping machine has a vertically extending drive shaft and a pair of detachably engaged surface gears. The surface gears have a curved upper surface gear, fixedly connected to the drive shaft, and a lower surface gear. A gearbox is connected to the lower surface gear and converts a horizontal rotating force of the drive shaft to a vertical rotating force. An externally threaded shaft is horizontally mounted to a vertically rotating gear of the gearbox. An internally threaded sleeve is disposed in the gear housing of the gear box and engages the externally threaded shaft so as to be horizontally moved by rotation. A saw part is fixed to a front end of the internally threaded sleeve. An internal tube, mounted around the drive shaft, has a thread at its upper portion and a lower portion with a diameter smaller than that of the upper portion. A vertically moving sleeve is slidably mounted around the lower portion of the drive shaft. A holding member holds the outside of the lower portion of the internal tube. An external tube engages the internal tube via its inner thread. A set screw secures the external tube at the drive shaft. A bearing supports the drive shaft at the external tube. A link rotatably connects the lower portion of the sleeve to the gearbox. A drive is connected to the drive shaft.

5 Claims, 7 Drawing Sheets

HORIZONTAL CUTTING-TYPE TAPPING MACHINE

BACKGROUND OF THE INVENTION

1. Field of the Invention

The present invention relates, in general, to tapping machines and, more particularly, to a horizontal cutting type tapping machine, allowing the saw part of the machine to be positioned close to a main pipeline, thereby effectively cutting an opening of a large diameter in a main pipeline.

2. Description of the Prior Art

In order to supply fluid, such as gas, water and water drainage from a source to a necessary location, supply pipelines are laid underground.

Supply pipelines for supplying a fluid from a source to a desired location comprise a main pipeline for supplying the fluid from a source to a place adjacent to the necessary location, a branch pipeline for supplying fluid from the main pipeline to the desired location, and a connecting pipe for connecting the main pipeline to the branch pipeline.

Referring to FIGS. 1 and 2, a process for installing the supply pipelines underground is performed by laying a main pipeline 1 underground, laying a branch pipeline 2 so that its one end is positioned over the main pipeline 1, connecting the main pipeline 1 to the end of the branch pipeline 2 by means of a vertical connecting pipe 3 having a flange 3a at its top, cutting an opening in the wall of the main pipe 1 by means of a horizontal cutting type-tapping machine, engaging a plug 4 with the flange 3a, and fixing a lid 5 to the flange 3a with bolts.

Incidentally, a specific technology is required for preventing leakage of the fluid during installation of the connecting pipe 3. On the other hand, since such technology is well known and is described in Korea patent No. 202503 granted to the instant applicant, the detailed description of the technology is omitted in this specification.

However, a pipe connecting structure of this type has problems in that the structure is subjected to load and vibration from the ground and becomes exposed (positioned outside the ground) because the branch pipeline 2 is disposed at a position above the main pipeline 1, thereby being easily damaged.

The underground-laying depths are usually prescribed by law. In Korea, the depth for laying supply pipelines under a road wider than 8 m is 1.2 m, the depth for laying supply pipelines under a road of less than 8 m width is 1.0 m, and the depth for laying supply pipelines in a residential district is 0.6 m.

As shown in FIG. 2, the supply pipelines are laid under a base layer and a surface layer, the base layer consisting of sand and pebbles, the surface layer being made of asphalt.

The main pipeline 1 and the branch pipeline 2 are preferably laid underground at the same depth, but the branch pipeline 2 has been disposed at a position above the main pipeline 1 because the connecting pipe 3 has to be vertically mounted and the main pipeline 1 must have an opening in its top portion.

The applicant of this invention holds Korea patent No. 202503, in which, in order to solve the abovementioned problems, the main pipeline and the branch pipeline are laid underground at the same depth and are connected by means of a horizontal connecting pipe (see FIGS. 3 and 4).

In such a case, a tapping machine for cutting an opening in the side of the main pipeline 1 comprises a main body 6 of the machine. A shut-off valve 9 is mounted under the main body 6.

A cutting head 7 is rotatably connected to the main body 6 through the extended drive shaft of the main body 6. A saw part 8 is fixed to the end of the horizontal rotating shaft of the cutting head 7.

In use of the tapping machine, the cutting head 7 is lowered to face the wall of the main pipeline 1, the horizontal rotating shaft of the cutting head 7 is moved forward, the drive shaft of the main body 6 is rotated so as to rotate the horizontal rotating shaft of the cutting head 7 and the saw part 8 is rotated by the rotation of the rotation shaft. Accordingly, an opening is cut in the side of the main pipeline by the rotation of the saw part 8.

However, according to the conventional horizontal cutting type-tapping machine, the saw part of the machine may not be positioned close to a main pipeline because the saw part is not able to be bent. As a result, effectively cutting an opening of a large diameter in a main pipeline is difficult.

SUMMARY OF THE INVENTION

Accordingly, the object of the present invention is to provide a horizontal cutting type-tapping machine, allowing the saw part of the machine to be positioned close to a main pipeline, thereby effectively cutting an opening of a large diameter in a main pipeline.

In order to accomplish the above object, the present invention provides a horizontal cutting type-tapping machine, comprising a vertically extending drive shaft, a pair of surface gears detachably engaged with each other, the surface gears having a curved upper surface gear being fixed to the drive shaft and a lower surface gear, a gearbox connected to the lower surface gear, the gearbox converting the horizontal rotating force of the drive shaft to the vertical rotating force, an externally threaded shaft horizontally disposed and fixed to a vertically rotating gear of the gearbox, an internally threaded sleeve disposed in the gear housing of the gear box and engaged with the externally threaded shaft in order to be moved horizontally by being rotated, a saw part fixed to the front end of the internally threaded shaft, an internal tube threaded at its upper portion, having a smaller diameter at its lower portion and mounted around the drive shaft, a vertically moving sleeve slidably mounted around the lower portion of the drive shaft, a holding member holding the outside of lower portion of the internal tube, an external tube internally threaded and engaged with the internal tube, a setscrew connecting the external tube to the drive shaft, a bearing disposed between the external tube and the drive shaft so as to center the drive shaft and facilitate rotation of the drive shaft, a link rotatably connecting the lower portion of the vertically moving sleeve to the gearbox, and a driving means is connected to the drive shaft so as to drive the drive shaft.

BRIEF DESCRIPTION OF THE DRAWINGS

The above objects, features, and advantages of the present invention will be explained in more detail in the following with the aid of the accompanying drawings, in which:

FIG. 6 is an enlarged partial sectional view, showing the operation of the horizontal cutting type-tapping machine of this invention;

DESCRIPTION OF THE PREFERRED EMBODIMENTS

Figure 1:
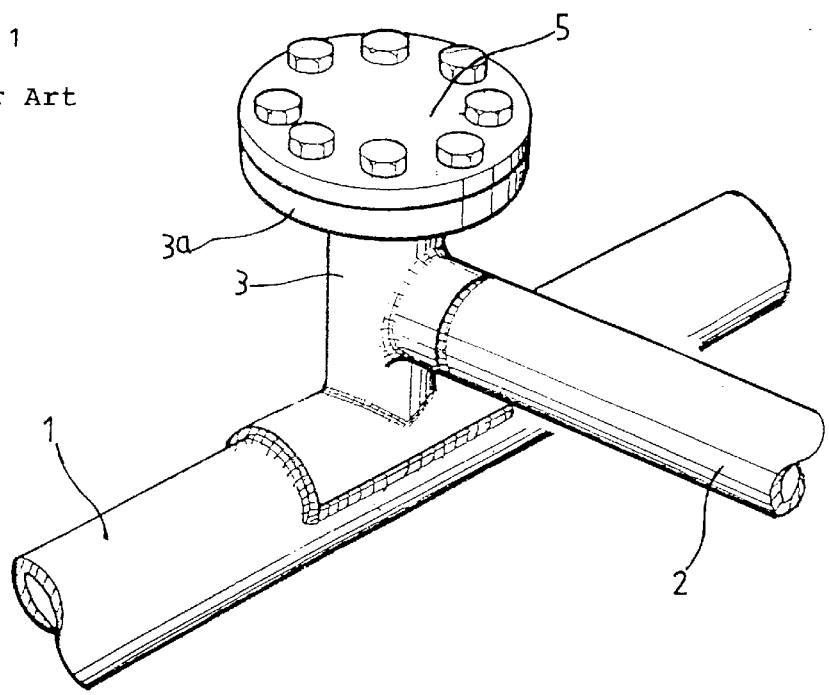
FIG. 1 is a perspective view, showing that a main pipeline is connected to a branch pipeline by means of a conventional vertical connecting pipe.
Figure 2:
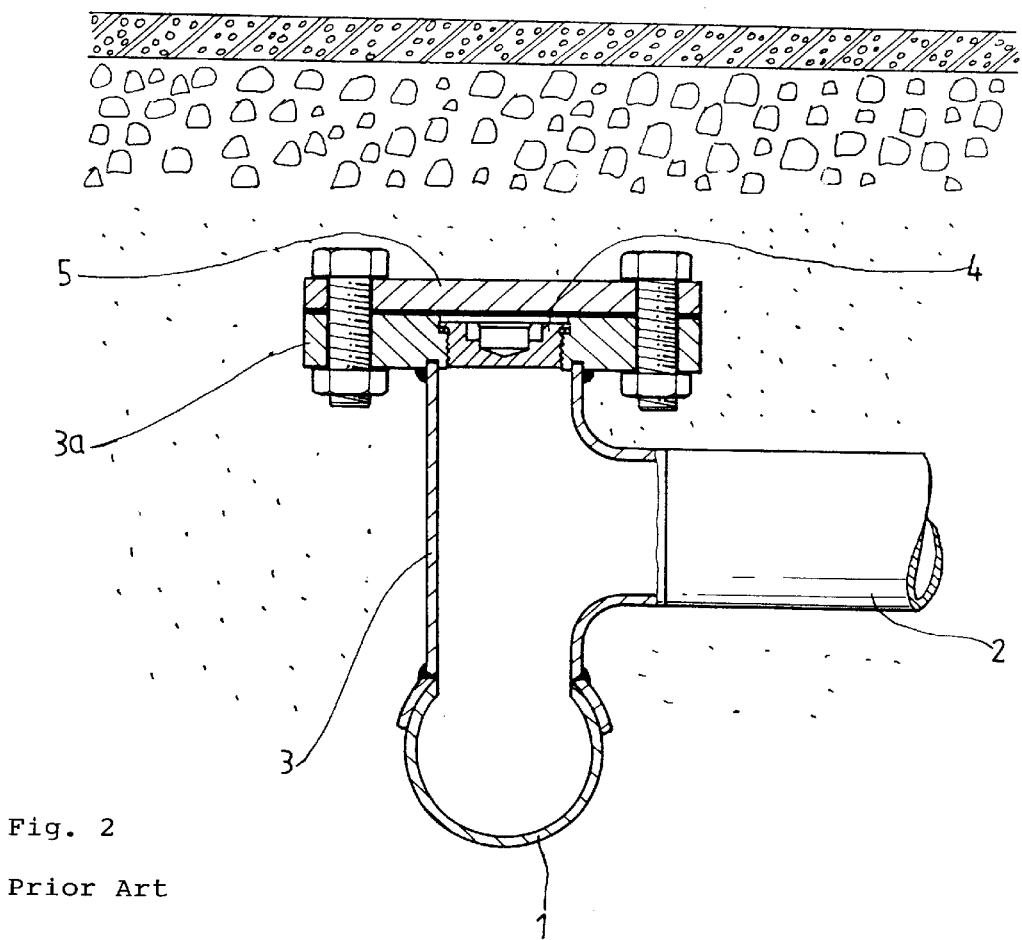
FIG. 2 is a vertical partial sectional view, showing that underground, the main pipeline is connected to the branch pipeline by means of the conventional vertical connecting pipe.
Figure 3:
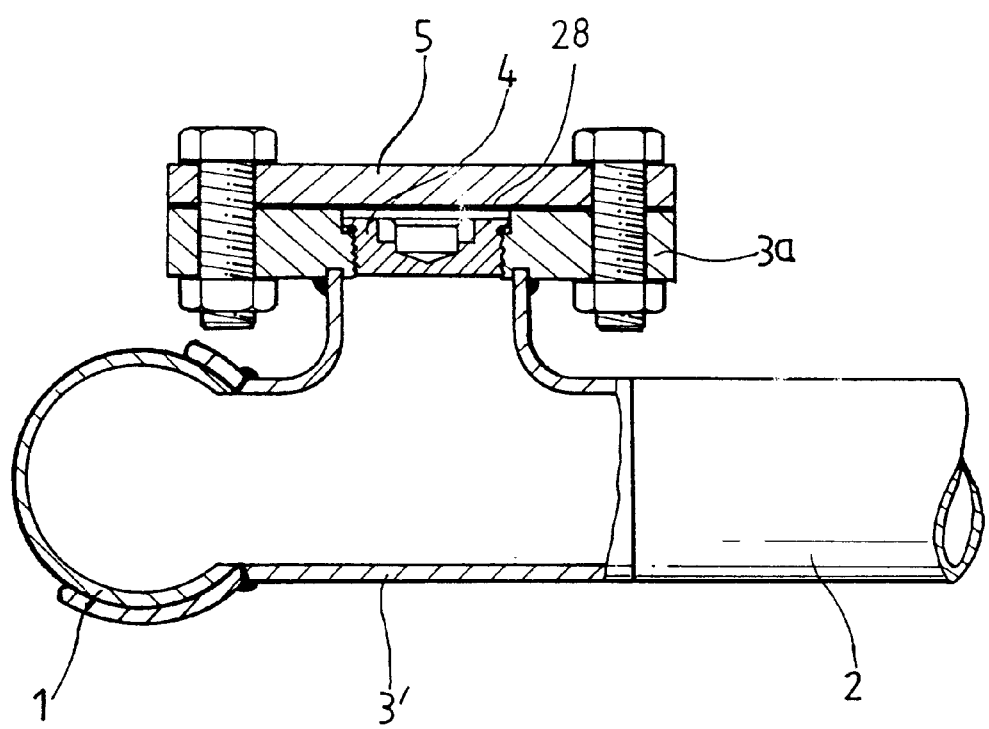
FIG. 3 is a vertical partial sectional view, showing that the main pipeline and the branch pipeline are connected to each other in a same horizontal plane.
Figure 4:
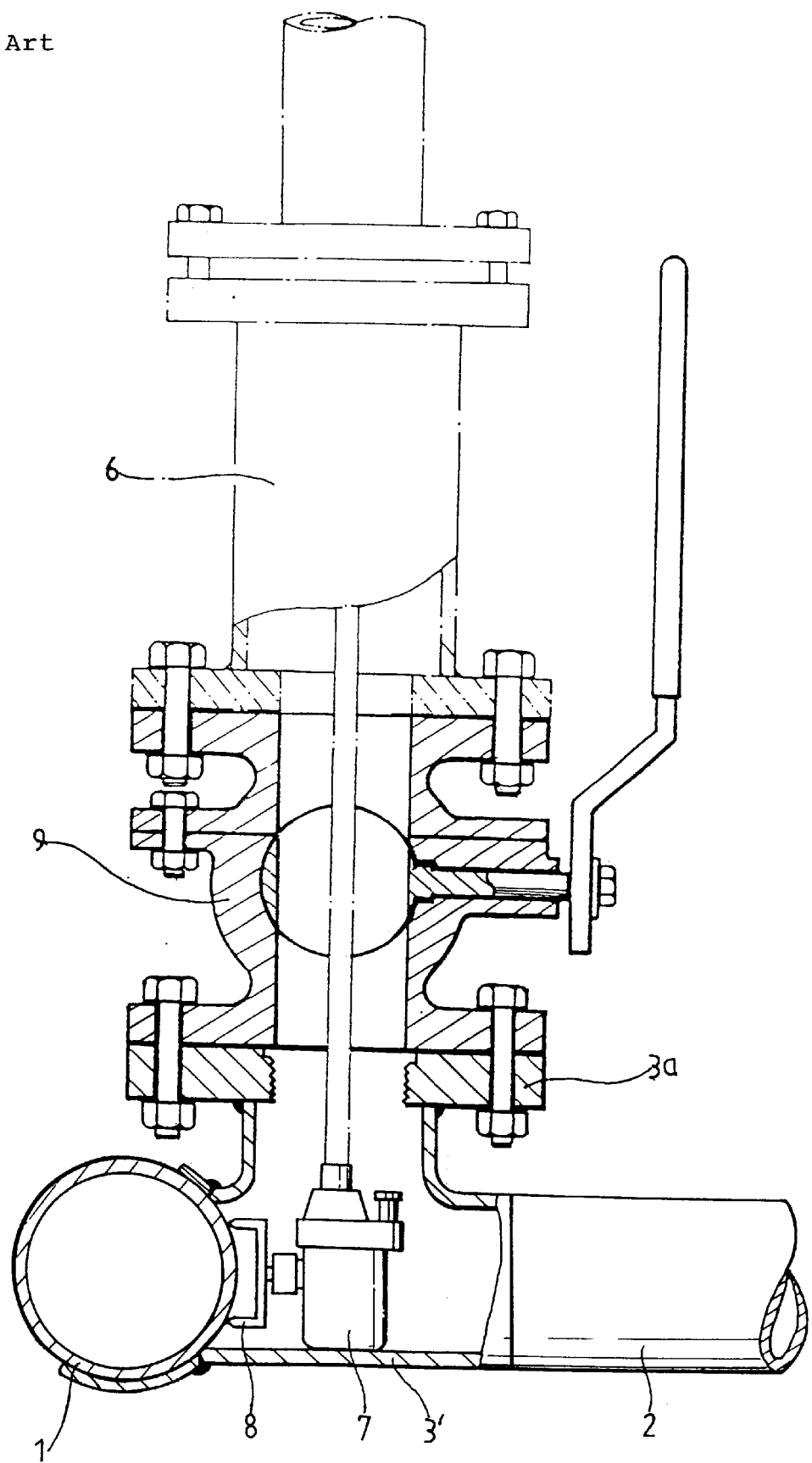
FIG. 4 is a partial sectional view, showing that a conventional horizontal cutting type-tapping machine cuts an opening in the wall of the main pipeline.

A horizontal cutting type-tapping machine comprises a drive shaft 10. The drive shaft 10 is extended vertically and may have a rectangular or hexagonal head so as to receive the driving power of a driving means. A pair of surface gears 12 are detachably engaged with each other, with the curved upper surface gear of the surface gears 12 being fixed to the drive shaft 10 at its top so as to receive the driving force of the drive shaft 10. The surface gears 12 may be detached from one another so as to cut power transmission from the drive shaft 10 to the drive shaft 13.

A gearbox 11 may be connected to the drive shaft 10 through the surface gears 12 so as to render power to be transmitted. The gearbox 11 includes a gear housing 26 and multiple gears so as to convert the horizontal rotating force of the drive shaft 10 to the vertical rotating force. The multiple gears may be bevel gears, worm gears or hypoid gears. A horizontally rotating gear of the gearbox 11 is connected to the lower surface gear of the surface gears 12.

An externally threaded shaft 13 is horizontally disposed and is fixed to a vertically rotating gear of the gearbox 11.

An internally threaded sleeve 14 is disposed in the gear housing 26 and is engaged with the externally threaded shaft 13 in order to be moved horizontally by being rotated.

A saw part 15 is fixed to the front end of the internally threaded shaft 13. The saw part 15 is provided with a forwardly projecting drill 15a and a magnet 15b. The magnet 15b is provided to remove metal chips made by cutting the opening into the main pipeline 1.

An internal tube 16, threaded at its upper portion and having a smaller diameter at its lower portion, is mounted around the drive shaft 10. The threaded portion of the internal tube 12 is designated by reference character 16a.

A vertically moving sleeve 27 is slidably mounted around the lower portion of the drive shaft 10 so as to move vertically together with the drive shaft 10.

A holding member 17 holds the outside of the lower portion of the internal tube 16. That is, the outside of lower portion of the internal tube 16 is tightly fitted in the holding member 17.

An external tube 18 is internally threaded and engages with the internal tube 16. A setscrew 19 connects the external tube 18 to the drive shaft 10. A bearing 20 is disposed between the external tube 18 and the drive shaft 10 so as to center the drive shaft 10 and facilitate rotation of the drive shaft 10. A thrust bearing may be employed as the bearing 20.

A link 21 rotatably connects the lower portion of the vertically moving sleeve 27 to the gearbox 11. A driving means 22 is connected to the drive shaft 10 so as to drive the drive shaft 10. The driving means 22 is illustrated as a driving lever in this embodiment, but may be an electric driving means, such as an electromotor.

A cap 23 may be mounted to the top of the external tube 18. The cap 23 surrounds the drive shaft 10.

A snap ring 24 is mounted at the bottom of the cap 23 and is secured in the drive shaft 10. Since the weight of the drive shaft 10 is supported by the snap ring 24, the drive shaft 10 rotates easily.

A bushing 25 is interposed between the lower end of the external tube 18 and the internal tube 16 and is fixed by a set screw. The bushing 25 functions to prevent vertical shaking of the external tube 18 during its vertical movement together with the drive shaft 10 and to prevent leakage of gas through the spaces between the drive shaft 10 and the internal tube 16 and between the internal tube 16 and the external shaft 18.

Figure 7:
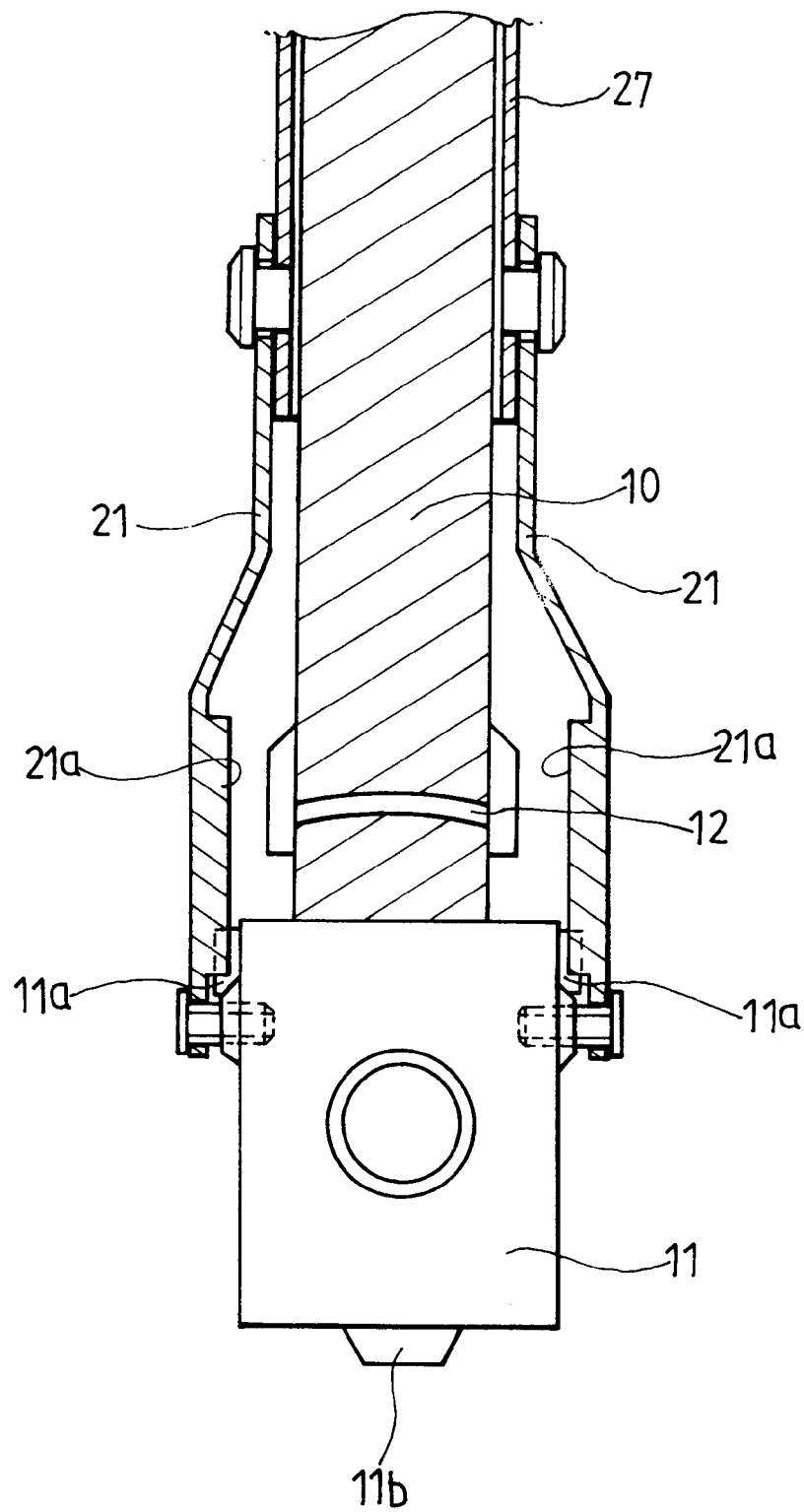
FIG. 7 is an enlarged side partial sectional view showing the connection of a drive shaft and a gearbox in this invention.
Figure 8:
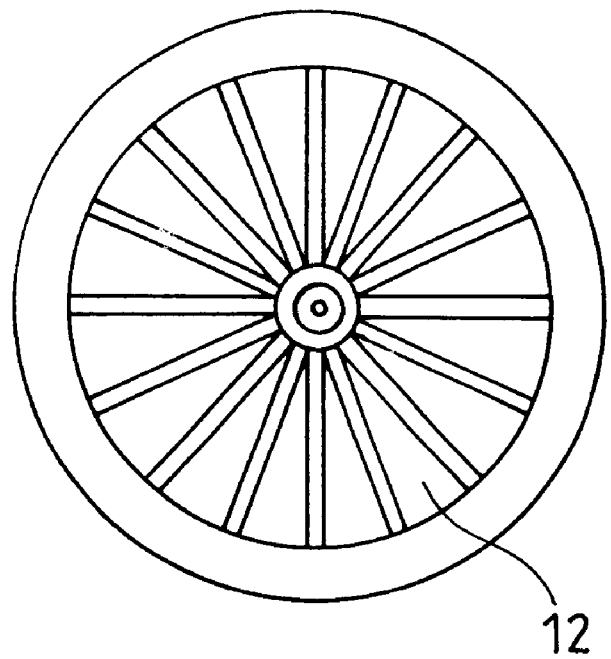
FIG. 8 is a bottom view, showing the upper curved surface gear of surface gears employed in this invention.

A shut-off valve 30 and a machine adaptor 30 are interposed between the holding member 17 and the connecting pipe 3'. As shown in FIGS. 6 and 7, the link 21 connecting the lower portion of the internal tube 16 to the gearbox 11 has a longitudinally extended protrusion 21a, while the gearbox 11 has a corresponding counter-protrusion 11a. Consequently, when the gearbox 11 and the saw part 15 are moved into the interior of the connecting pipe 3', the protrusions 21a and 11a prevent the gearbox 11 and the saw part 15 from being tilted opposite to the main pipeline 1 and allow the gearbox 11 and the saw part 15 to be tilted toward the main pipeline 1 as shown in FIG. 6.

The gearbox 11 may be formed with a support 11b at its rear bottom and a roller 26a at its front bottom. The operation of this embodiment is described in the following. The connecting pipe 3' is welded to the main pipeline 1 and the branch pipeline 2. Since the main pipeline 1 is welded to the connecting pipe 3' using a reinforcing plate, the connecting pipe 3' is firmly fixed to the main pipeline 1.

The shut-off valve 30 and the machine adaptor 31 are fixedly stacked on the flange 3a of the connecting pipe 3'. After that, the horizontal cutting type-tapping machine according to this embodiment is installed. The holding member 17 is fixed to the machine adaptor 31 and the shut-off valve 30 is opened. The drive shaft 10 is rotated by the driving means 22 while the setscrew 19 connects the drive shaft 10 to the external tube 18.

When the driving means 22 is rotated, the drive shaft 10 is rotated together with the external tube 18. In such a case, since the external tube 18 is rotated and the internal tube 16 is fixed, the drive shaft 10 and the external shaft 18 move downwardly. As the drive shaft 10 moves downwardly, the vertically moving sleeve 27 moves downwardly also. FIG. 6 shows that the drive shaft 10, the external shaft 18, and the moving sleeve 27 are transferred downward. The moving sleeve 27 stops moving downwardly because the upper end of the moving sleeve 27 is held by the end of the inner tube 16.

Figure 5:
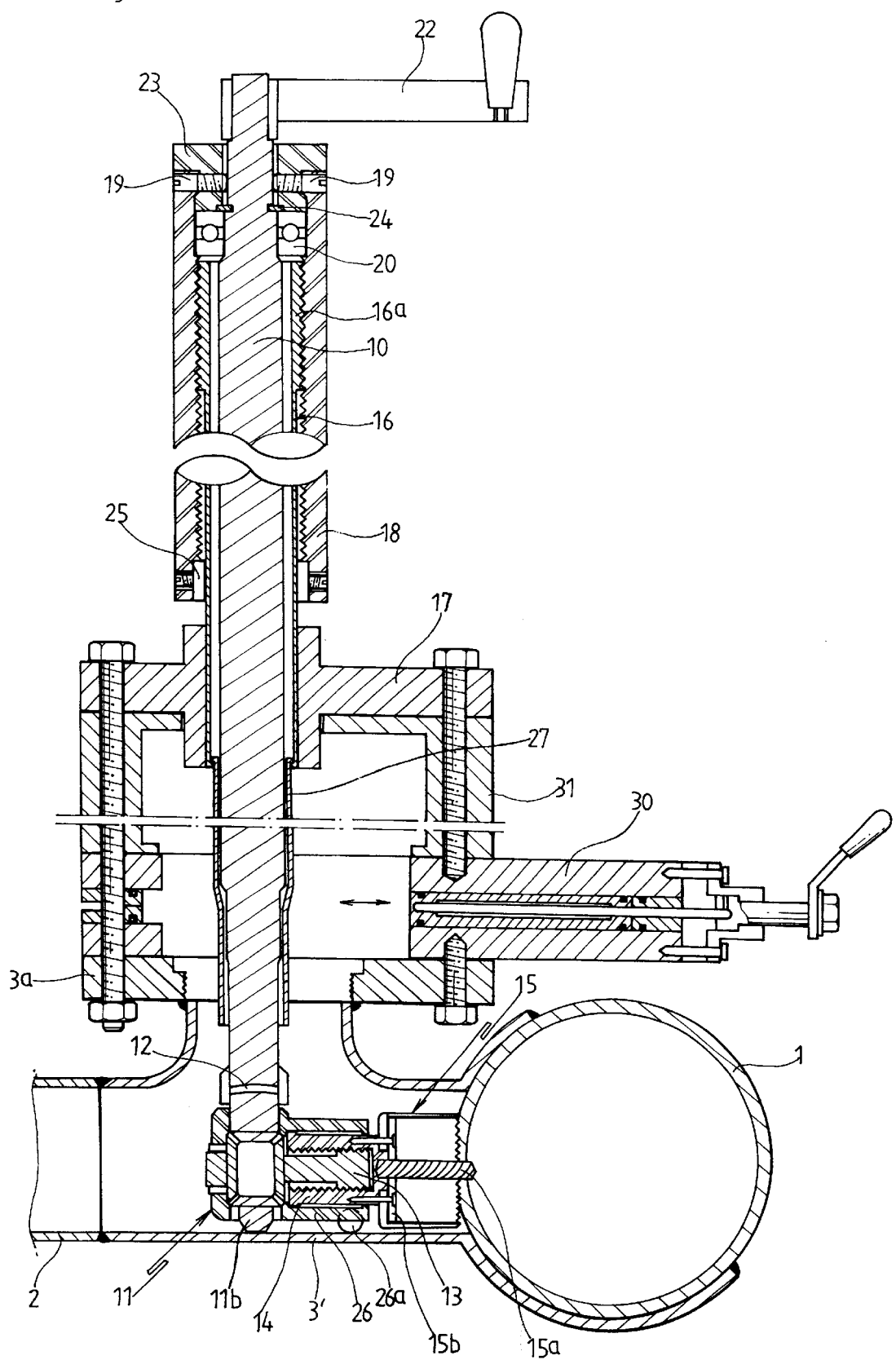
FIG. 5 is a sectional view, showing that a horizontal cutting-type tapping machine according to a preferred embodiment of this invention cuts an opening in the wall of the main pipeline.
Figure 9:
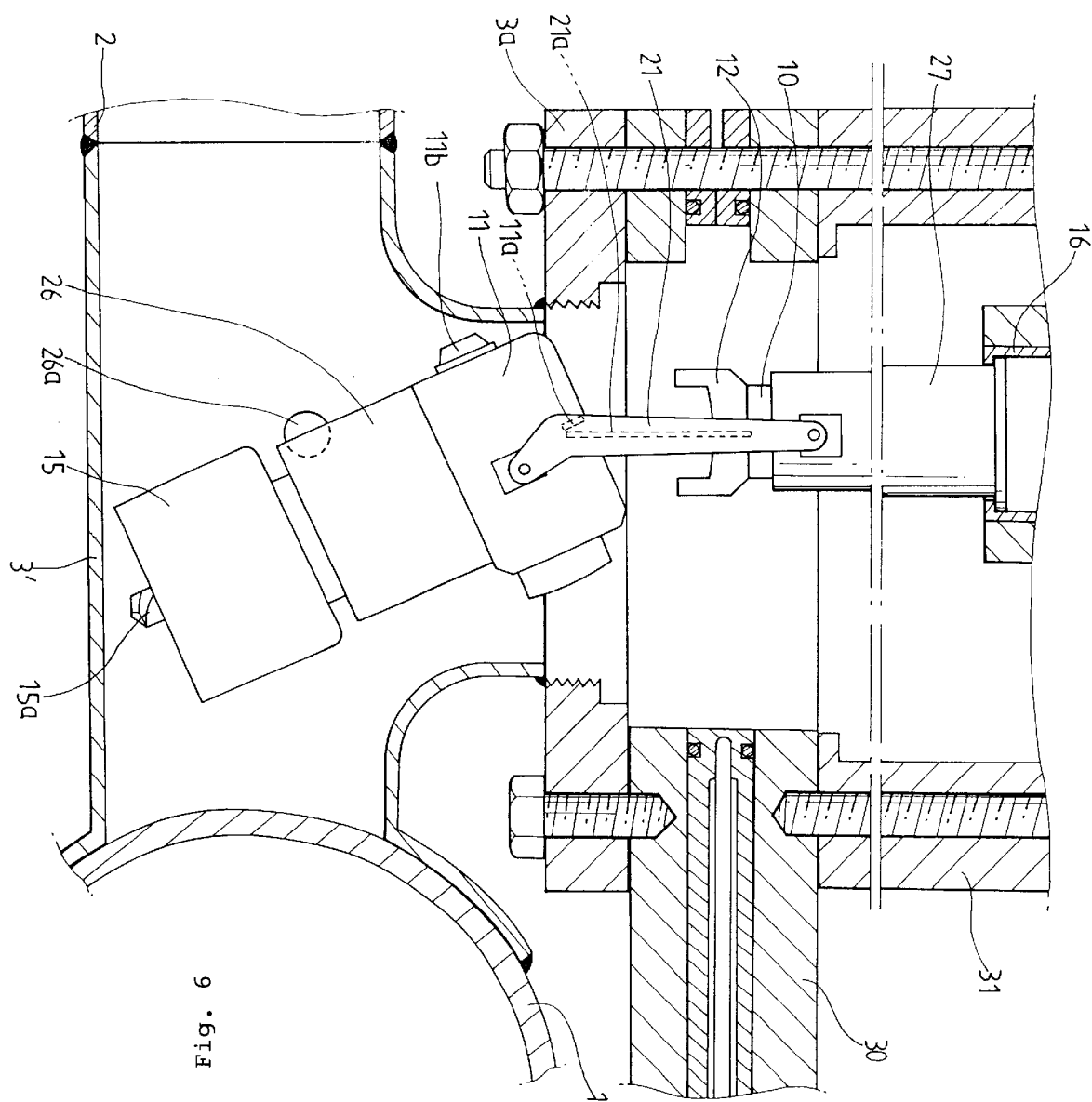

When the drive shaft 10 is continuously rotated and the saw part 15 comes into contact with the bottom surface of the interior of the connecting pipe 3', the gearbox 11 and the saw part 15 are rotated counterclockwise, so that the saw part 15 moves close to the sidewall of the main pipeline 1. At the same time, the surface gears 12 are engaged with each other. This state is illustrated in FIG. 5. Subsequently, after the drive shaft 10 is disconnected from the external tube 18 by unfastening the setscrew 19, the drive shaft 10 is continuously rotated. As a result, the drive shaft 10 is rotated, but is not moved downwardly. The horizontal rotating force of the drive shaft 10 is converted to the vertical rotating force by the gearbox 11, so that the horizontal rotating force horizontally rotates the externally threaded shaft 13. When the externally threaded shaft 13 is horizontally rotated, the internally threaded sleeve 14 and saw part 15 are horizontally rotated and move close to the main pipeline 1.

When a drill 15a of the saw part 15 comes into contact with the main pipeline 1, the drill 15a exerts force to the main pipeline 1 due to the vertical rotating force of the internally threaded sleeve 14.

Firstly, the drill 15a pierces the main pipeline 1 to firmly connect the saw part 15 to the main pipeline 1. Secondly, the ring-shaped saw teeth arrangement of the saw part 15 cut an opening into the wall of the main pipe 1. The metal chips generated by cutting adhere to the magnet 15a and are removed later.

After an opening is cut, the internally threaded sleeve 14 and the saw part 15 are returned to their initial positions by rotating the drive shaft 10 in the opposite direction. After that, the drive shaft 10 is connected to the external tube 18 by fastening the setscrew 19.

When the drive shaft 10 is continuously rotated, the drive shaft 10 moves upward together with the external tube 18. Subsequently, the surface gears 12 are separated from each other and the curved upper surface gear of the surface gears 12 continuously moves upward. While the curved upper surface gear of the surface gears 12 moves upward, the lower end of the curved upper surface gear comes into contact with the lower end of the vertically moving sleeve 27. As a result, the drive shaft 10 moves together with the vertically moving sleeve 27. Incidentally, as the vertically moving sleeve 27 moves upward, the gearbox 11 and the saw part 15 connected to the vertically moving sleeve 27 by the link 21 move over the shut-off valve 30.

In such a case, since gas flows through the cut opening into the connecting pipe 3', the horizontal cutting type tapping machine of this embodiment is removed after the shut-off valve 30 is closed for preventing leakage of the gas. Subsequently, after the plug 4 is engaged with the flange 3a, the shut-off valve 30 and the machine adaptor 31 are removed from the connecting pipe 31 and a lid 5 is attached to the flange 3a by means of bolts. This completes a process for installing supply pipelines.

As described above, the present invention provides a horizontal cutting type-tapping machine, allowing the saw part of the machine to be positioned close to a main pipeline, thereby effectively cutting an opening of a large diameter in a main pipeline.

Although the preferred embodiments of the present invention have been disclosed for illustrative purposes, those skilled in the art will appreciate that various modifications, additions and substitutions are possible, without departing from the scope and spirit of the invention as disclosed herein.

What is claimed is:

1. A horizontal cutting type-tapping machine, comprising:
a vertically extending drive shaft (10);
a pair of surface gears (12) detachably engaged with each other, said surface gears (12) comprising a curved upper surface gear, fixedly connected to said drive shaft (10), and a lower surface gear;
a gearbox (11) connected to said lower surface gear, said gearbox converting a horizontal rotating force of said drive shaft (10) to a vertical rotating force;
an externally threaded shaft (13) horizontally disposed and fixed to a vertically rotating gear of said gearbox (11);
an internally threaded sleeve (14) disposed in said gear box (11) and engaging said externally threaded shaft (13) so as to be moved horizontally by rotation of said externally threaded shaft (13);
a saw part (15) fixed to a front end of said internally threaded sleeve (14);
an internal tube (16) having a thread at an upper portion (16a) thereof and having a lower portion with a diameter smaller than a diameter of said upper portion (16a);
said internal tube (16) mounted around said drive shaft (10);
a vertically moving sleeve (27) slidably mounted around said lower portion of said drive shaft (10);
a holding member (17) holding an outside of said lower portion of said internal tube (16);
an external tube (18) internally threaded and engaging said internal tube (16);
a set screw (19) connecting said external tube (18) to said drive shaft (10);
a bearing (20) disposed between said external tube (18) and said drive shaft (10) so as to center said drive shaft (10) and facilitate rotation of said drive shaft (10);
a link (21) rotatably connecting said lower portion of said vertically moving sleeve (27) to said gearbox (11); and
a driving means (22) connected to said drive shaft (10) so as to drive said drive shaft (10).

2. The machine according to claim 1, comprising:
a cap (23) mounted to an top of said external tube (18), said cap (23) surrounding said drive shaft (10);
a snap ring (24) mounted at a bottom of said cap (23) and secured in said drive shaft (10);
a bushing (25) interposed between a lower end of said internal tube and said external tube; and
a setscrew securing said bushing (25).

3. The machine according to claim 1, wherein said saw part (15) has a forwardly projecting drill (15a) and a magnet (15b) to remove metal chips.

4. The machine according to claim 1, wherein said link (21) connecting said lower portion of said sleeve (27) to said gearbox (11) has a longitudinally extending protrusion and said gearbox has a cooperating counter-protrusion (11a) so as to tilt said gearbox (11) toward the main pipeline.

5. The machine according to claim 1, wherein said gearbox (11) has a support (11b) at a rear bottom thereof and a roller (26a) at a front bottom thereof.

* * * * *